(No Model.)

J. C. CHAPMAN.
METALLIC PACKING FOR PISTON RODS.

No. 350,116. Patented Oct. 5, 1886.

WITNESSES.
Frank G. Parker
William Edson

INVENTOR.
John C. Chapman

UNITED STATES PATENT OFFICE.

JOHN C. CHAPMAN, OF BOSTON, MASSACHUSETTS.

METALLIC PACKING FOR PISTON-RODS.

SPECIFICATION forming part of Letters Patent No. 350,116, dated October 5, 1886.

Application filed July 12, 1886. Serial No. 207,836. (No model.)

*To all whom it may concern:*

Be it known that I, JOHN C. CHAPMAN, of Boston, in the county of Suffolk and State of Massachusetts, have invented a new and useful Improvement in Metallic Packing for Piston-Rods, &c., of which the following, taken in connection with the accompanying drawings, is a specification.

The object of my invention is to combine a soft metallic collar around a piston or valve rod with a packing-box, so that by simply screwing down the follower of the packing-box the metallic collar is compressed bodily, so as to closely embrace the rod and make with it a steam-tight joint. I attain this object by the mechanism illustrated in the accompanying drawings, in which—

Figure 1:
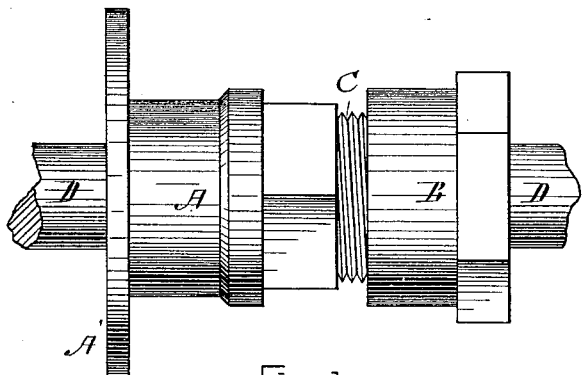
Figure 2:
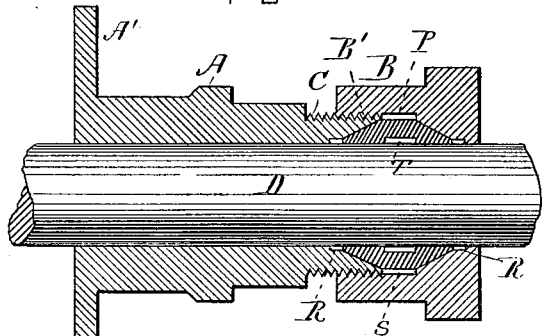
Figure 3:
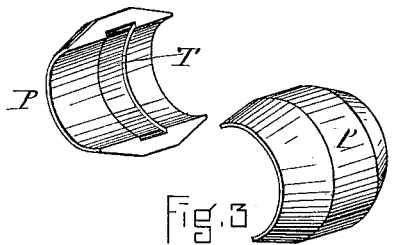

Figure 1 is an elevation showing my device. Fig. 2 is a vertical section of the same, and Fig. 3 shows in perspective the packing proper in two parts, as I prefer to make it.

In my device the ordinary form of the packing-box may be used, the only needed alteration being in the form of the interior of the box, that should be coned, as shown in Fig. 2, and provided with recesses R R and space S, so that in the compression of the soft-metal packing P room is provided for the free flow or creeping of the compressed metal, thus giving that amount of freedom to the metal to allow it to adapt itself to accurately fit the rod and make a steam-tight joint.

I will now proceed to describe one form of my improved packing.

A and B, Figs. 1 and 2, represent the two parts of the packing-box, and are made in the usual manner, except the coned recesses that hold the packing P, Fig. 2, are provided with open spaces R R and S, to accommodate the flow of the metal of the packing P while it is under pressure, from the closing of the packing-box A B, and in the act of tightening to a steam-tight joint about the piston or valve rod.

In Fig. 3 I have shown in perspective an illustration of my soft-metal packing. The two parts, when placed together on the packing-box, form a ring around the piston which is yielding and compressible, and thus adapted to its use. The form of this compressible ring P may be varied without materially affecting its use, so long as the form is of such a nature as to adapt it to be compressed about the piston-rod, and thus form a steam-tight joint, for instance; but one end of the packing-ring may be coned and the other end left flat.

For the purpose of avoiding unnecessary friction I form a recess, T, Fig. 2, in the interior of the packing P, so as to leave a space next to the rod D for holding steam, oil, or water, as the case may be.

I claim—

The combination of the packing-box A B, having recesses R R, and being interiorly coned, with a soft-metal piece, P, adapted to fit the coned space in the packing-box and to be compressed, all substantially as described, and for the purpose set forth.

JOHN C. CHAPMAN.

Witnesses:
WILLIAM EDSON,
WALTER CHESTER LINNELL.